(12) United States Patent
Zhu

(10) Patent No.: US 6,625,216 B1
(45) Date of Patent: Sep. 23, 2003

(54) MOTION ESTIMATION USING ORTHOGONAL TRANSFORM-DOMAIN BLOCK MATCHING

(75) Inventor: Daniel Q. Zhu, Columbus, NJ (US)

(73) Assignee: Matsushita Electic Industrial Co., Ltd., Osaka (JP)

( * ) Notice: Subject to any disclaimer, the term of this patent is extended or adjusted under 35 U.S.C. 154(b) by 0 days.

(21) Appl. No.: 09/239,089

(22) Filed: Jan. 27, 1999

(51) Int. Cl.$^7$ ................................................. H04N 7/12

(52) U.S. Cl. ................................. 375/240.16; 348/699

(58) Field of Search .................. 375/240.12, 240.16, 375/240.18, 240.24; 348/403.1, 407.1, 409.1, 415.1, 416.1, 699, 700; H04N 7/12

(56) References Cited

U.S. PATENT DOCUMENTS

| | | | |
|---|---|---|---|
| 5,198,901 A | | 3/1993 | Lynch |
| 5,337,085 A | | 8/1994 | Lee et al. |
| 5,347,309 A | * | 9/1994 | Takahashi et al. ...... 375/240.12 |
| 5,471,252 A | | 11/1995 | Iu |
| 5,475,430 A | | 12/1995 | Hamada et al. |
| 5,544,263 A | | 8/1996 | Iwamura |
| 5,694,173 A | * | 12/1997 | Kimura et al. ........... 348/423.1 |
| 5,703,650 A | | 12/1997 | Robinson |
| 5,731,850 A | * | 3/1998 | Maturi et al. ............... 348/699 |
| 5,732,157 A | * | 3/1998 | Osawa ........................ 382/244 |
| 5,786,856 A | | 7/1998 | Hall et al. |
| 5,815,602 A | * | 9/1998 | Ueda et al. .................. 382/236 |
| 6,128,341 A | * | 10/2000 | Kwak .......................... 375/240 |
| 6,205,177 B1 | * | 3/2001 | Girod et al. ............. 375/240.14 |

FOREIGN PATENT DOCUMENTS

| | | |
|---|---|---|
| EP | 0639925 A | 2/1995 |
| EP | 0696002 | 2/1996 |

OTHER PUBLICATIONS

Song et al, "Motion Estimation in DCT Domain", 1996, International Conference On Communication Technology, pp. 670–674.*

Koc et al; "DCT–Based Subpixel Motion Compensation and Fully DCT–Based Video Coder", 1997 IEEE, pp. 598–601.*

European Search Report, Jul. 3, 2001.

N.M.Nasrabadi et al.; "A New Image Coding Technique Using Transforms Vector Quantization"; Mar. 19–21, 1984, New York, IEEE, US, vol. Conf. 9, 1984, pp. 29901–29904.

Jong–Nam Kim et al., "A Fast Three–Step Search Algorithm With Minimum Checking Points Using Unimodal Error Surface Assumption," IEEE Transactions on Consumer Electronics, vol. 44, No.. 3, pp. 638–647 (1998).

* cited by examiner

*Primary Examiner*—Nhon Diep
(74) *Attorney, Agent, or Firm*—RatnerPrestia (57) ABSTRACT

A block matching system matches a motion block in one video image frame to a matching block another video image frame. The system includes a plurality of Hadamard transform processors which transform the motion block and a plurality of trial matching blocks from the other video image frame. The transformed matching blocks are then compared to the transformed motion block, and the transformed matching block which has the smallest difference relative to the transformed motion block is determined. The matching block which corresponds to the determined transformed matching block is selected as the matching block for the motion block. The block matching system may transform motion blocks having different numbers of rows and columns. In one application, the system matches a relatively large motion block in the one frame to a corresponding large matching block in the other frame and determines a displacement between the matching block and the motion block. This displacement is used to guide the selection of trial matching blocks when smaller motion blocks in the one frame are matched to blocks in the other frame.

11 Claims, 7 Drawing Sheets

MOTION ESTIMATION USING ORTHOGONAL TRANSFORM-DOMAIN BLOCK MATCHING

BACKGROUND OF THE INVENTION

The present invention relates to image block matching methods and in particular to a method of matching blocks of pixels between two images which operates in the domain of an orthogonal transform.

Motion estimation a fundamental type of digital video processing. Motion estimation can be found in many digital video applications, for example, video coding, motion compensated video standards conversion and machine vision. Motion information in the context of video coding is useful to reduce signal entropy so that a compressed video signal can be transmitted through a bandwidth-constrained channel. Motion information in the context of video standards conversion helps the converter to recover missing data, spatially and/or temporally, by interpolating the signal along the motion path. Motion information is useful in machine vision applications to allow a robot to find or follow a workpiece through various processing steps. In each of these instances, motion estimation typically uses a pixel-domain block matching (BM) technique and the matching criterion is the minimum mean-square-error (MSE) between the motion block in the current frame and the trial matching blocks in the search frame. The minimum MSE may be replaced by minimum mean absolution difference (MAD) for a more cost-effective hardware implementation.

Pixel-domain BM techniques are well suited to these applications because of their algorithmic simplicity and because they may be implemented using very large scale integrated (VLSI) circuitry. These existing BM techniques may provide less than optimal results, however, because they are based on pixel-domain comparison and because the best match is determined based on the minimum error index (MAD/MSE). It is generally agreed that the pixel-domain MSE (or cross-correlation) measure is not fully consistent with image visual error as perceived by humans. Consequently the error measure currently used in motion estimation requires further modification. In other words, the characteristics of human visual system should be considered during the matching process.

SUMMARY OF THE INVENTION

This invention is embodied in a motion estimation technique that takes human visual characteristics into consideration. The scheme uses transform-domain block matching techniques to achieve more accurate motion vectors than can be achieved using pixel-domain block matching techniques.

According to one aspect of the invention the motion estimation method performs a transform operation on the motion block and on all trial matching blocks. The method then compares the transformed motion block to each of the transformed trial matching blocks and selects, as the matching block, the trial matching block which exhibits the smallest difference with the motion block in the transform domain.

According to another aspect of the invention, the transform operation is a Hadamard transform operation.

According to another aspect of the invention, the method calculates the mean-squared error (MSE) between the transformed motion block and each of the transformed trial matching blocks and selects, as the matching block, the transformed trial matching block having the minimum MSE.

According to another aspect of the invention, the method calculates the mean absolute difference (MAD) between the transformed motion block and each of the transformed trial matching blocks and selects, as the matching block, the transformed trial matching block having the minimum MAD.

According to yet another aspect of the invention, the method allows the size of the motion block to be changed.

DETAILED DESCRIPTION

Motion estimation techniques are widely used in video analysis, coding and standards conversion. In video coding, motion information is used to reduce image entropy and so reduce the number of bits that are needed to transmit or store an image. In video standards conversion applications, motion information is often used to aid interpolation of the missing pixels. In machine vision, motion estimation may be used to limit the portion of the image which needs to be analyzed. In all cases, the quality of the coded or converted images is directly linked to the accuracy of the motion estimation. Although in the real world the observable data captured by a camera is image intensity and not image motion. The perceived temporal displacement of intensity patterns in an image sequence owing to relative motion of the objects and the viewer is a significant aspect in image analysis and is called optical flow. Optical flow provides information pertaining to the spatial arrangement and structure of moving objects. Therefore, especially in machine vision and standards conversion applications, it is desirable to model true motion by estimating the optical flow in the image sequence.

Block-based motion estimation and compensation techniques are among the most popular approaches for video coding and standards conversion. One exemplary block-based motion estimation and compensation technique is described in U.S. Pat. No. 5,198,091 entitled DERIVATION AND USE OF MOTION VECTORS IN A DIFFERENTIAL PULSE CODE MODULATION SYSTEM, which is incorporated herein by reference for its teaching on block-based motion estimation techniques. Block-based motion estimation has been adopted in the international standards for digital video compression, such as H.261 and MPEG 1–2. These standards, however, do not specify a particular motion estimation method. Block-based motion estimation is also widely used in several other digital video applications, including motion-compensated filtering (interpolation) for standards conversion and machine vision.

The block-motion model assumes that a video image is composed of moving blocks. To reduce the computational complexity, a simple 2-D translational motion is often assumed. Among many other block-based motion estimation algorithms, block matching can be considered as the most popular method for practical motion estimation realization due to its lesser hardware complexity. As a result, it's widely used in VLSI, and almost all H.261 and MPEG 1–2 codecs use block matching for motion estimation. Many of these block matching techniques use a pixel-domain search procedure to identify the best motion vector estimate for a given motion block.

Figure 1:
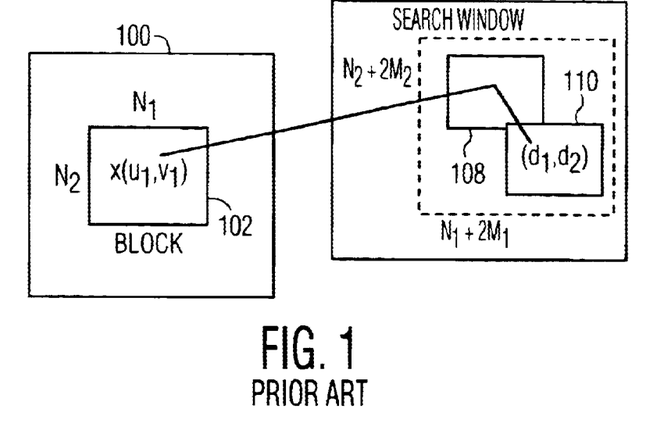
FIG. 1 (prior art) is a multi-frame image diagram which is useful for describing block matching techniques.

The basic block matching algorithm is shown in FIG. 1, where the displacement for a pixel $x(u_1,v_1)$ in current frame (reference frame) 100 is determined by considering a $N_1 \times N_2$ motion block 102 centered at $(u_1,v_1)$ and searching next/previous frame (search frame) 104 for the location of the best-matching block 110, of the same size. Once the best matching block is found, the motion vector is determined relative to a block 108 which occupies the same position in the search image as the motion block occupies in the current image. The search is usually limited to a $N_1+2M_1 \times N_2+2M_2$ region (search window) 106 for computational reasons. Block matching algorithms may differ in the following aspects: the matching criteria (e.g., minimum cross-correlation, minimum MSE, minimum MAD), the search strategy (e.g., 3-step fast search), or the determination of block size (e.g., hierarchical)

The focus is on the matching criterion used to find the best matching block from among the plurality of trial matching blocks.

Typically, matching criteria are based on pixel-domain error index measures such as the maximum cross-correlation and the minimum MSE. To reduce computational requirement in block matching, the minimum mean absolute difference (MAD) or the maximum matching pixel count (MPC) may replace MSE or MAD, at the expense of compromising the performance. In the minimum MSE criterion, a MSE is defined by equation (1).

$$MSE(d_1, d_2) = \frac{1}{N_1 N_2} \sum_{(u_1,v_1) \in R} [((f(u_1, v_1, k) - f(u_1 + d_1, v_1 + d_2, k \pm 1))]^2 \quad (1)$$

Where R denotes a $N_1 \times N_2$ block, for a set of candidate motion vectors $(d_1,d_2)$. The estimation of the motion vector is taken to be the value of $(d_1,d_2)$ which minimizes the MSE, as shown in equation (2).

$$[d_1, d_2]^T = \arg\min_{(d_1,d_2)} MSE(d_1, d_2) \quad (2)$$

Because it is difficult to efficiently realize the square operation in hardware, a minimum MAD criterion, defined by equation (3), may be used instead of the MSE criterion.

$$MAD(d_1, d_2) = \frac{1}{N_1 N_2} \sum_{(u_1,v_1) \in R} |f(u_1, v_1, k) - f(u_1 + d_1, v_1 + d_2, k \pm 1)| \quad (3)$$

Then the displacement estimate is given by equation (4).

$$[d_1, d_2]^T = \arg\min_{(d_1,d_2)} MAD(d_1, d_2) \quad (4)$$

If the difference between the two frames represents interframe motion, the displacement may be translated directly into a motion vector as an ordered pair of values which represents the displacement of a predetermined pixel of the motion block along, for example, x and y coordinate axes, between the current frame and the search frame.

In real-world video applications, the accuracy of the motion estimation schemes is ultimately judged by viewers regardless of which matching criterion is employed. It is generally agreed that the pixel-domain error measure (e.g., MSE, MAD) is not fully consistent with image visual error as it is perceived by the human eye. Consequently the error measures currently used in motion estimation require further modification to accommodate characteristics of the human visual system. The present invention takes these characteristics into account by performing block matching not in the pixel domain but in a transform (sequence/frequency) domain. The use of a sequence/frequency domain transform may provide more effective block matching because perceived image block errors are more noticeable if they occur in lower spatial frequency components rather than in higher spatial frequency components. The typical pixel-based block matching technique, because it operates only in the pixel domain, treats all pixels equally during the match.

The inventive method first transforms the motion block and the trial matching blocks into an orthogonal domain and then conducts a coefficient-by-coefficient comparison using, for example, a MSE/MAD matching criterion. There are several advantages of using transform-domain block matching over conventional pixel-domain block matching:

(1) The lower-order transform components are more likely to have an effect on the matching outcome which is consistent with human's perception;

(2) The effective noise power in the transform domain is reduced;

(3) The motion estimation error is smaller than that of a pixel-domain block matching technique if the assumption that the image exhibits only transnational motion is violated.

There are a number of transformations that could translate image block into a sequence/frequency domain. The Fourier transform (FT), the discrete cosine transform (DCT) and the Hadamard transform (HT) are three representative methods. Since the FT and DCT operations are complex and real number transforms, respectively, they are not considered due to their relatively high cost in hardware implementation. HT is more suitable to the task due to its pure +1 and −1 transform kernel and the existence of a fast transform algorithm. Therefore it takes much less hardware logic to realize HT processing than FT or DCT processing. Although the subject invention is described in terms of the Hadamard transforms, it is contemplated that it may be practiced with any frequency/sequence domain transform or other orthogonal transform in which signal energy is compressed into a relatively small number of components. In addition, although the subject invention is described as using the minimum mean absolute difference (MAD) of the transformed blocks to identify the best matching block, it is contemplated that other matching measures may be used, such as maximum cross-correlation, minimum MSE or maximum matching pixel count (MPC).

A Hadamard matrix, H=($h_{ij}$) is defined as a square matrix of dimension nxn where i. All entries are ±1;

ii. Any two distinct rows are orthogonal, i.e., ∀ i, j, i ≠ j, $$\sum_{k} h_{ik} h_{jk} = 0.$$

iii. The order of the Hadamard matrix must be 1, 2, 4, 8, 16, . . . , 4 m, where m=1, 2, . . .

Without the loss of generality, we consider a commonly used subset of the Hadamard matrix for transform, namely the Sylvester-Hadamard matrix of rank $2^n$. Its recursive form is defined by equation (5).

$$H_n = H_1 \otimes H_{n-1} \tag{5}$$

Where $\otimes$ denotes Knonecker product, and $$H_1 = \begin{pmatrix} +1 & +1 \\ +1 & -1 \end{pmatrix}.$$

Thus $$H_2 = \begin{pmatrix} +1 & +1 & +1 & +1 \\ +1 & -1 & +1 & -1 \\ +1 & +1 & -1 & -1 \\ +1 & -1 & -1 & +1 \end{pmatrix},$$

$$H_3 = \begin{pmatrix} +1 & +1 & +1 & +1 & +1 & +1 & +1 & +1 \\ +1 & -1 & +1 & -1 & +1 & -1 & +1 & -1 \\ +1 & +1 & -1 & -1 & +1 & +1 & -1 & -1 \\ +1 & -1 & -1 & +1 & +1 & -1 & -1 & +1 \\ +1 & +1 & +1 & +1 & -1 & -1 & -1 & -1 \\ +1 & -1 & +1 & -1 & -1 & +1 & -1 & +1 \\ +1 & +1 & -1 & -1 & -1 & -1 & +1 & +1 \\ +1 & -1 & -1 & +1 & -1 & +1 & +1 & -1 \end{pmatrix} \text{ and}$$

$$H_4 = \begin{pmatrix} +1 & +1 & +1 & +1 & +1 & +1 & +1 & +1 & +1 & +1 & +1 & +1 & +1 & +1 & +1 & +1 \\ +1 & -1 & +1 & -1 & +1 & -1 & +1 & -1 & +1 & -1 & +1 & -1 & +1 & -1 & +1 & -1 \\ +1 & +1 & -1 & -1 & +1 & +1 & -1 & -1 & +1 & +1 & -1 & -1 & +1 & +1 & -1 & -1 \\ +1 & -1 & -1 & +1 & +1 & -1 & -1 & +1 & +1 & -1 & -1 & +1 & +1 & -1 & -1 & +1 \\ +1 & +1 & +1 & +1 & -1 & -1 & -1 & -1 & +1 & +1 & +1 & +1 & -1 & -1 & -1 & -1 \\ +1 & -1 & +1 & -1 & -1 & +1 & -1 & +1 & +1 & -1 & +1 & -1 & -1 & +1 & -1 & +1 \\ +1 & +1 & -1 & -1 & -1 & -1 & +1 & +1 & +1 & +1 & -1 & -1 & -1 & -1 & +1 & +1 \\ +1 & -1 & -1 & +1 & -1 & +1 & +1 & -1 & +1 & -1 & -1 & +1 & -1 & +1 & +1 & -1 \\ +1 & +1 & +1 & +1 & +1 & +1 & +1 & +1 & -1 & -1 & -1 & -1 & -1 & -1 & -1 & -1 \\ +1 & -1 & +1 & -1 & +1 & -1 & +1 & -1 & -1 & +1 & -1 & +1 & -1 & +1 & -1 & +1 \\ +1 & +1 & -1 & -1 & +1 & +1 & -1 & -1 & -1 & -1 & +1 & +1 & -1 & -1 & +1 & +1 \\ +1 & -1 & -1 & +1 & +1 & -1 & -1 & +1 & -1 & +1 & +1 & -1 & -1 & +1 & +1 & -1 \\ +1 & +1 & +1 & +1 & -1 & -1 & -1 & -1 & -1 & -1 & -1 & -1 & +1 & +1 & +1 & +1 \\ +1 & -1 & +1 & -1 & -1 & +1 & -1 & +1 & -1 & +1 & -1 & +1 & +1 & -1 & +1 & -1 \\ +1 & +1 & -1 & -1 & -1 & -1 & +1 & +1 & -1 & -1 & +1 & +1 & +1 & +1 & -1 & -1 \\ +1 & -1 & -1 & +1 & -1 & +1 & +1 & -1 & -1 & +1 & +1 & -1 & +1 & -1 & -1 & -1 \end{pmatrix}$$

The 2-D square Hadamard transform is defined by equation (6).

$$F = H_m f_{N_1 N_2} H_n \tag{6}$$

Where $H_m$ and $H_n$ are $N_1 \times N_1$ ($2^m \times 2^m$) and $N_2 \times N_2$ ($2^n \times 2^n$) Hadamard matrices, respectively. The matrix $f_{N_1 N_2}$ is an image data matrix with dimension of $N_1 \times N_2$. Note: It is also possible to Hadamard-transform an image data matrix with order that conforms to the third property of Hadamard matrixes, defined above.

Like the traditional pixel-domain BM, the Hadamard transform-domain BM determines the displacement for a pixel $f(u_1, v_1)$ in current frame (reference frame) by considering a $N_1 \times N_2$ motion block centered at $(u_1, v_1)$ and searching the next (or previous) frame (search frame) for the location of the best matching block of the same size. The search is also limited to a $N_1 + 2M_1 \times N_2 + 2M_2$ region. The difference is that the blocks in the reference and in the search frames both undergo individual Hadamard transformations, as defined by equations (7) and (8).

$$F_{ref}(R) = H_m f_{ref}(R) H_n \tag{7}$$

$$F_{search}(R) = H_m f_{search}(R) H_n; \tag{8}$$

Where R denotes a block of pixels of size $N_1 \times N_2$.

The MAD criterion can be used to calculate transform-domain block difference according to equation (9).

$$MAD(d_1, d_2) = K_0 \sum_{(u_1, u_2) \in R} |(F_{ref}(u_1, v_1, k) - F_{search}(u_1 + d_1, v_1 + d_2)| \tag{9}$$

Then the displacement estimate can be calculated by equation (10).

$$[d_1, d_2]^T = \arg \min_{(d_1, d_2)} MAD(d_1, d_2) \quad (10)$$

Although the matching criteria for BM is changed, the proposed transform-domain BM (TBM) can be used with other variations of the BM algorithm family. For example, TBM can be used in hierarchical motion estimation algorithms in which the matching block is identified by initially searching using a decimated, low-resolution version of the current and search images and using the match determined for these images to refine the search for successively higher resolution images. Alternatively, rather than filtering and decimating the image, a larger block size and corresponding higher-order Hadamard matrix may be used to find a coarse motion vector and then the block size and matrix size may be successively reduced to translate the coarse motion vector into one or more fine motion vectors.

The technique may also be used with fast-search motion estimation algorithms such as the three-step search method disclosed by J. N. Kim and T. S. Choi in their article entitled "A Fast Three-Step Search Algorithm With Minimum Checking Points Using Unimodal Error Surface Assumption" *IEEE Trans. on Consumer Electronics*, Aug. 1998, pp 638–648, which is incorporated by reference for its teaching on fast-search motion estimation algorithms. Using these fast search techniques, the motion block from the current frame and each trial matching block from the search frame may be transformed before each step of the technique is performed. In addition, because the TBM technique is more sensitive to the spatial frequency content of the image, it is applicable to image sequences which exhibit non-translational motion such as rotation or zoom.

Figure 2:
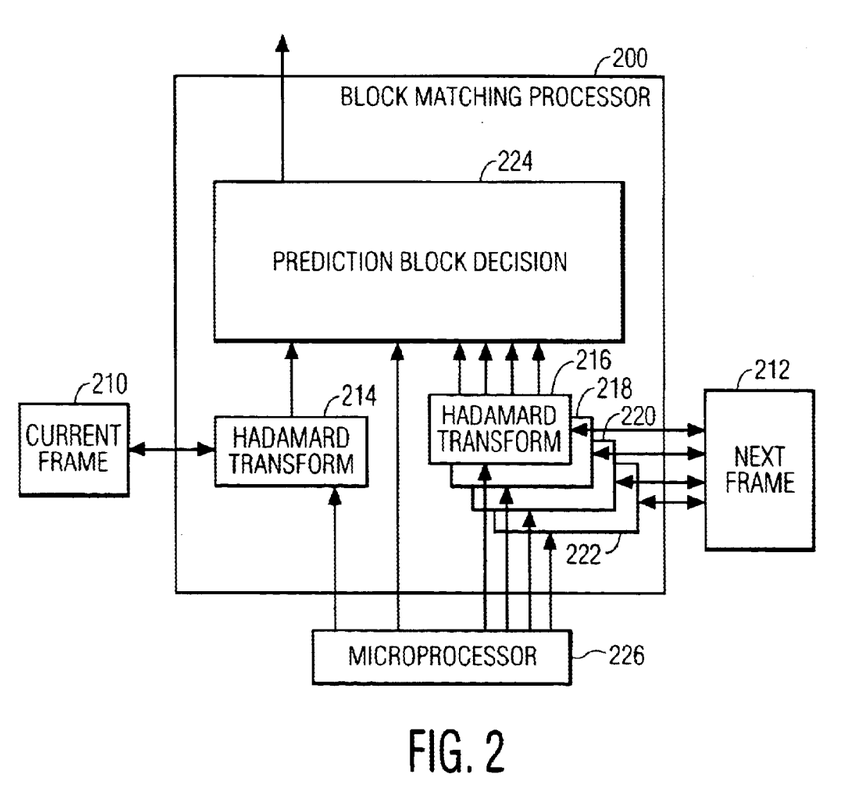
FIG. 2 is a block diagram of an exemplary block matching processor according to the present invention.

FIG. 2 is a block diagram of circuitry suitable for use in implementing a transform block matching algorithm according to the present invention. The circuitry shown in FIG. 2 maps motion blocks from a current frame 210 into matching blocks from a next frame 212. The block matching processor 200 includes a Hadamard transform processor 214 which selects the motion block from the current frame 210 under control of microprocessor 226.

The block matching processor 200 also includes a plurality of Hadamard transform processors 216, 218, 220 and 222 which, under control of the microprocessor 226, select trial matching blocks from the next frame memory 212. The microprocessor 226 may control the Hadamard transform processors 214 through 222 to select blocks from the current frame 210 and next frame 212 according to a full search algorithm, or a fast search algorithm. If the block matching processor 200 is used in a system which employs a hierarchical block matching technique, the size of the blocks of pixels fetched from the current frame and the next frame may be varied in one or both of the X and Y directions and a corresponding Hadamard transformation may be applied to the fetched blocks of pixels as described above with reference to equations (7) and (8).

The transformed blocks of pixel data provided by the transform processors 214 through 222 are applied to a prediction block decision processor 224. The processor 224 may, for example, apply the minimum MAD criteria, as described above with reference to equations (9) and (10) to the various transformed blocks of pixel values to select the transformed search block having the least mean absolute difference with respect to the transformed motion block.

The prediction block decision processor 224 is also coupled to receive block identification signals from the microprocessor 226. Upon identifying the search block which satisfies the criterion of equation (10), the displacement between the motion block and this search block may be calculated by the prediction block decision processor 224. This displacement is expressed as a motion vector which is the output signal provided by the prediction block decision processor 224.

Figure 3:
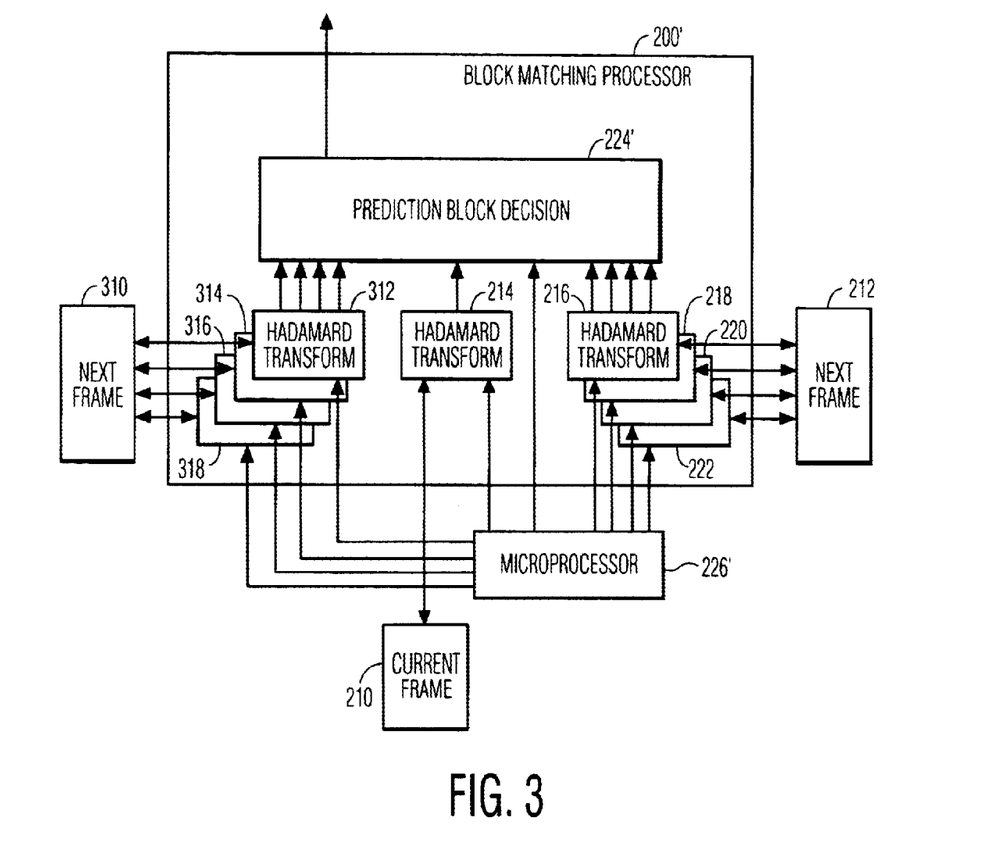
FIG. 3 is a block diagram of another exemplary block matching processor according to the present invention.

FIG. 3 is a block diagram of an alternative block matching processor 200'. This processor extends the block matching processor 200 shown in FIG. 2 by searching for matching blocks in both a prior frame 310 and a next frame 212. As shown in FIG. 3, the exemplary block matching processor 200' includes Hadamard transform processors 312, 314, 316 and 318 which are controlled by a microprocessor 226' to fetch and transform trial matching blocks from a prior frame 310 before applying these blocks to the prediction block decision processor 224'. The remainder of the circuitry shown in FIG. 3 is identical to that shown in FIG. 2 and is not described. The block decision processor 224' calculates the minimum absolute difference between the transformed motion block from the current frame 210 and any of the provided transformed blocks from the prior frame 310 or the next frame 212.

Figure 4:
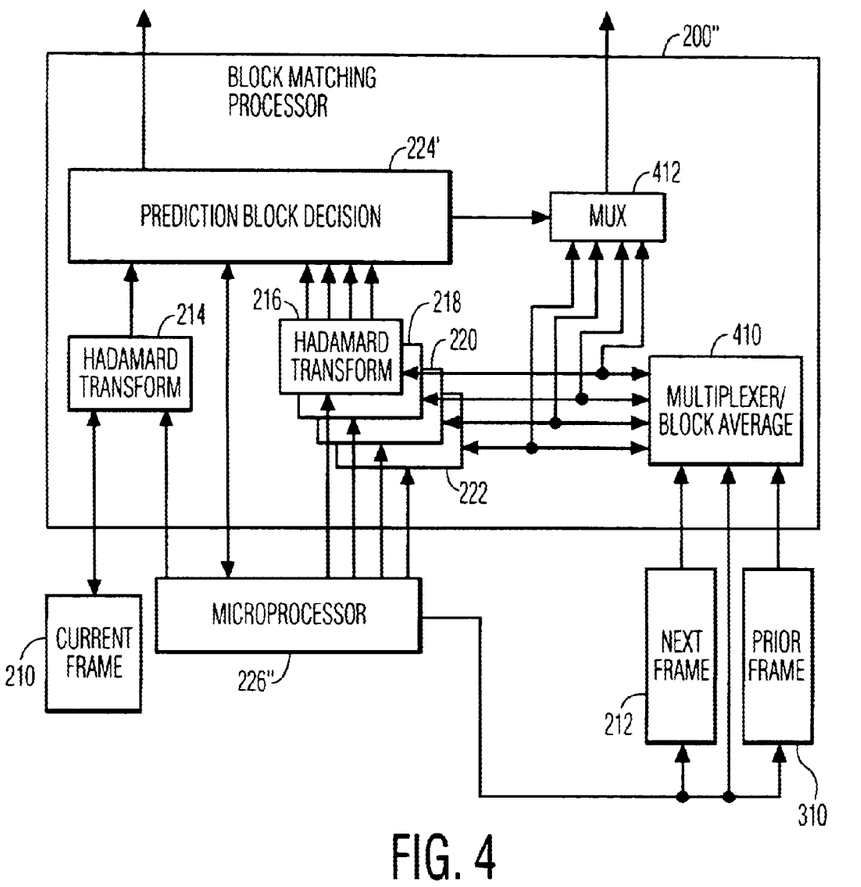
FIG. 4 is a block diagram of yet another exemplary block matching processor according to the present invention.

The exemplary embodiment of the invention shown in FIG. 3 processes the trial matching blocks from the next frame and the prior frame in parallel. FIG. 4 shows an alternative embodiment of the invention in which the trial matching blocks from the next frame and prior frame are processed in three sequential steps. The system shown in FIG. 4 includes a multiplexer/block average processor 410 which is coupled to receive trial matching blocks from the next frame 212 and prior frame 310. The processor 410 is also coupled to receive a control signal from microprocessor 226". The block matching processor 200" operates as follows. In a first interval, the motion block from the current frame 210 is applied to the Hadamard transform processor 214 and then to the prediction block decision processor 224". Also in this interval, the trial matching blocks from the prior frame are applied to the respective Hadamard transform processors 216, 218, 220 and 222, via the multiplexer/block average processor 410 to produce transformed trial matching blocks which are applied to the prediction block decision processor 224".

During this first interval, the prediction block decision processor 224" chooses the transformed matching block from the prior frame which has the least mean absolute difference with respect to the transformed motion block.

During a second time interval, while the transformed motion block is still applied to the prediction block decision processor 224", the microprocessor 226" switches the multiplexer/block average processor 410 to provide trial matching blocks from the next frame 212. During this second time interval, the matching blocks from the next frame are transformed by the Hadamard transform processors 216, 218, 220 and 222 to produce transformed matching blocks for application to the prediction block decision processor 224". In this second time interval, the prediction block decision processor 224" selects one of the matching blocks from the next frame, based on the mean absolute difference between each of the transformed matching blocks and the transformed motion block.

In a third time interval, the prediction block decision processors 224" notifies the microprocessor 226" of the selected matching blocks from the next frame 212 and prior frame 310. The multiplexer/block average processor 410, then averages the selected blocks from the next frame and prior frame and provides the averaged block to one of the Hadamard transform processors, for example, processor 216. This transformed block is applied to the prediction block decision processor 224" which, during the third time interval, calculates the mean absolute difference between the transformed motion block, as provided by the Hadamard transform processor 214, and the transformed average block as provided by the transform processor 216.

The prediction block decision processor 224" then compares the mean absolute difference for the transformed averaged block to the mean absolute difference for the transformed selected blocks from the next frame 212 and prior frame 310. The block having the minimum mean absolute difference determines the motion vector that is applied by the block matching processor 200". In comparing the mean absolute difference of the transformed averaged block to mean absolute differences of the matching blocks from the next and prior frames, the prediction block decision processor 224" may store the MAD values from the next and prior frames or it may receive the transformed matching blocks from the next and prior frames at the same time that it receives the transformed average block. In this instance, the transformed matching blocks may be routed, by the multiplexer/block average circuitry 410 to respective ones of the Hadamard transform processors 216, 218, 220 and 222, for example, processors 218 and 220.

The circuitry shown in FIG. 4 may, for example, be used in a transcoding processor such as an MPEG-2 encoder, which employs both forward-predictive and bidirectionally-predictive motion compensated encoding techniques.

The exemplary block matching processors shown in FIGS. 2, 3, and 4 are shown as providing 4 trial matching blocks from the next frame and/or prior frame for comparison to the motion block from the current frame. These figures are only illustrative. It is contemplated that, for example, using a full search motion estimation technique, as many as 256 trial matching blocks may be provided from each of the prior frame and next frame. For a fast search process, such as that described in the above referenced article, each of the next frame and prior frame may provide 8 motion blocks during each step of the 3 step process.

Figure 5:
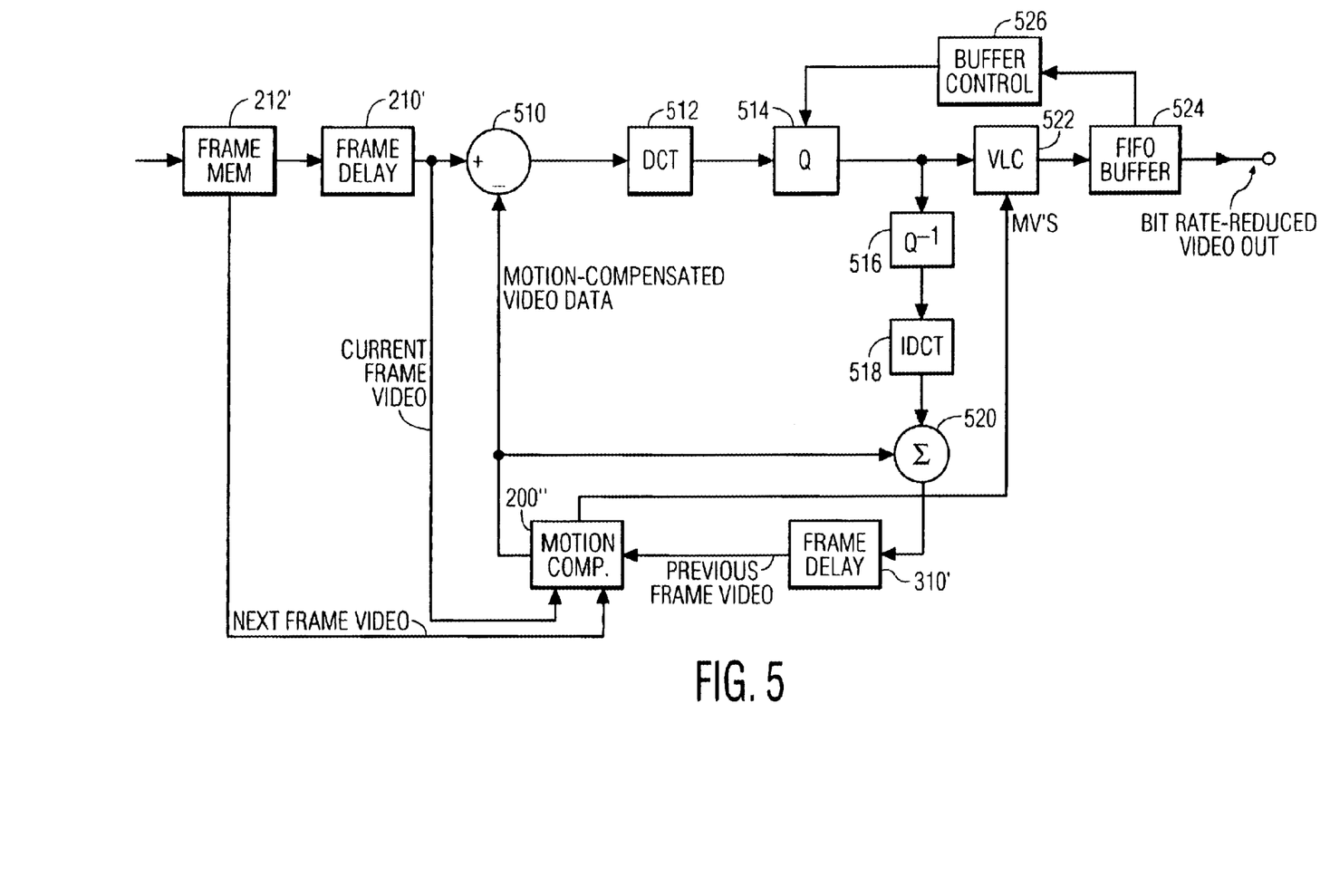
FIG. 5 is a block diagram of a video signal encoding system which uses a block matching processor such as that shown in FIG. 4.

FIG. 5 is a block diagram of a conventional motion adaptive video encoder circuit which has been adapted to include an embodiment of the present invention and which may, for example, produce encoded video signals according to the MPEG-2 standard. In the system shown in FIG. 5, an input video signal is applied to a frame memory 212' which is coupled to the motion compensation processor 200". The motion compensation processor accesses the frame memory to obtain trial matching blocks from the next frame. A frame memory 212' in the exemplary embodiment of the invention is also coupled to a frame delay 210'. While the frame memory 212' holds one frame of video information, the immediately prior frame is provided to the decoding circuitry via the frame delay 210'. The output signal provided by the frame delay 210' is the current video frame which is coupled to the motion compensation processor 200" to provide the motion blocks as described above with reference to FIG. 4. The motion compensation processor 200" is also coupled to a frame delay 310' to receive trial matching blocks from the previous image frame.

In general terms, the encoder shown in FIG. 5 operates by encoding differential pixel values obtained by subtracting current video information, provided by the frame delay 210', from motion compensated video data provided by the motion compensation processor 200".

In the exemplary embodiment of the invention, the motion compensated video data provided by the processor 210" is subtracted from the current video data by the subtracter 510. The resulting difference signals are subject to a discrete cosine transform (DCT) process in the DCT processor 512. The transformed difference signals provided by the processor 512 are applied to a quantization circuit 514. As described below, the quantization resolution of the DCT encoded difference signal is controlled responsive to a buffer control processor 526. The output signals of the quantization processor 514 are applied to a variable length coder 522 which also receives motion vectors provided by the motion compensation processor 200". The variable length coder 522 applies entropy coding to the quantized transformed differential code values and to the motion vectors to produce an encoded output video stream. The encoded video stream is applied to a first in first out (FIFO) buffer 524 which provides the bit rate reduced encoded video signal at an output port to a transport channel.

Depending on the detail and the amount of motion in the video image, the video data provided to the FIFO buffer 524 may be at a higher rate than can be supported by the transport channel. As the transport channel limit is approached, the FIFO buffer 524 signals the buffer control circuitry 526 to reduce the quantization resolution applied by the quantizer 514 in order to reduce the volume of data which is used to represent the encoded video signal. Because of the buffer control circuitry 526, he encoding processor shown in FIG. 5 is able to reliably encode image sequences having different level of detail and motion into a uniform bit-rate video signal.

The previous frame of video data provided by the frame delay circuitry 310' is regenerated from the encoded video signal. In the exemplary embodiment of the invention, an inverse quantization circuit 516, reverses the quantization operation that is performed by the quantizer 514 and applies the dequantized, transformed differentially coded video signal to an inverse discrete cosine transform processor 518. The processor 518 reverses the DCT operation performed by the processor 512 to provide decoded differential video signal to a summing circuit 520. The summing circuit 520 reconstitutes the data from the current frame by adding the motion compensated video data to the decoded differential video data. The reconstituted data is applied to the frame delay circuit 310' which delays the current frame data by one frame interval to provide previous frame video data to the motion compensation processor 200".

Figure 6:
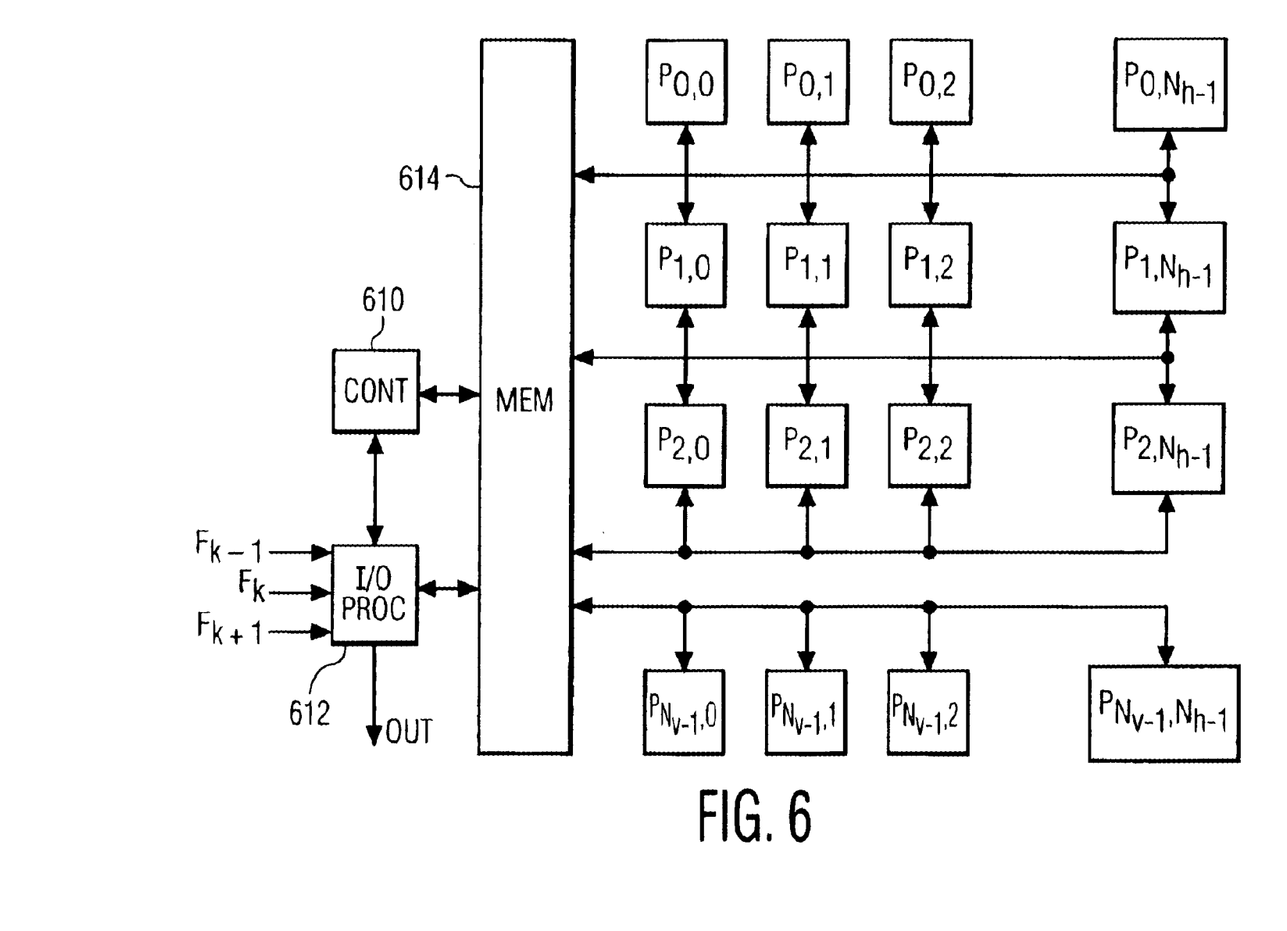
FIG. 6 is a block diagram of a machine vision system which generates a motion vector field using a block matching technique according to the present invention.

FIG. 6 is a block diagram of a highly parallel processor system which may be used to generate motion vector fields in accordance with an exemplary embodiment of the present invention. This processor system includes NH times NV processors $P_{0,0}$ through $P_{N_{v-1}}$, $N_{h-1}$. Thus, the processor system has one processor for each block of the image where the image includes NH horizontal blocks by NV vertical blocks or NH times NV blocks.

As shown in FIG. 6, input samples corresponding to a current field, $F_k$ at previous field, $F_{k-1}$ and a next field, $F_{k+1}$, are applied to an input/output (I/O) processor 612. This processor stores the samples into a multiport memory 614 under control of a control processor 610. The memory 614 may be, for example, a distributed memory having a respectively different portion co-resident with each of the plurality of processors $P_{0,0}$ through $P_{N_{v-1}}$, $N_{h-1}$. The controller 610 and the plurality of processors, $P_{0,0}$ through $P_{N_{v-1}}$, $N_{h-1}$ operate according to the method described above with reference to FIGS. 2, 3, and 4 to produce samples representing a motion vector field for the current image from samples representing 2 or 3 image fields.

Although the I/O processor 612 is shown as receiving 3 frames of data, it is contemplated that in steady state operation, only one new frame of data may be applied to the processor 612 at any given time. Two of the previously stored frames may simply be redesignated such that the stored data corresponding to the frame $F_k$ will become data representing frame $F_{k+1}$ and the stored data corresponding to the frame $F_{k-1}$ will become data representing frame $F_k$. In the exemplary embodiment of the invention, each processor, for example $P_{0,0}$, obtains a respectively different motion block of pixel data from frame $F_k$ via one port of the memory 614. The processor also obtains the trial matching blocks from frame $F_{k-1}$ and frame $F_{k+1}$ via the memory port.

Figure 7:
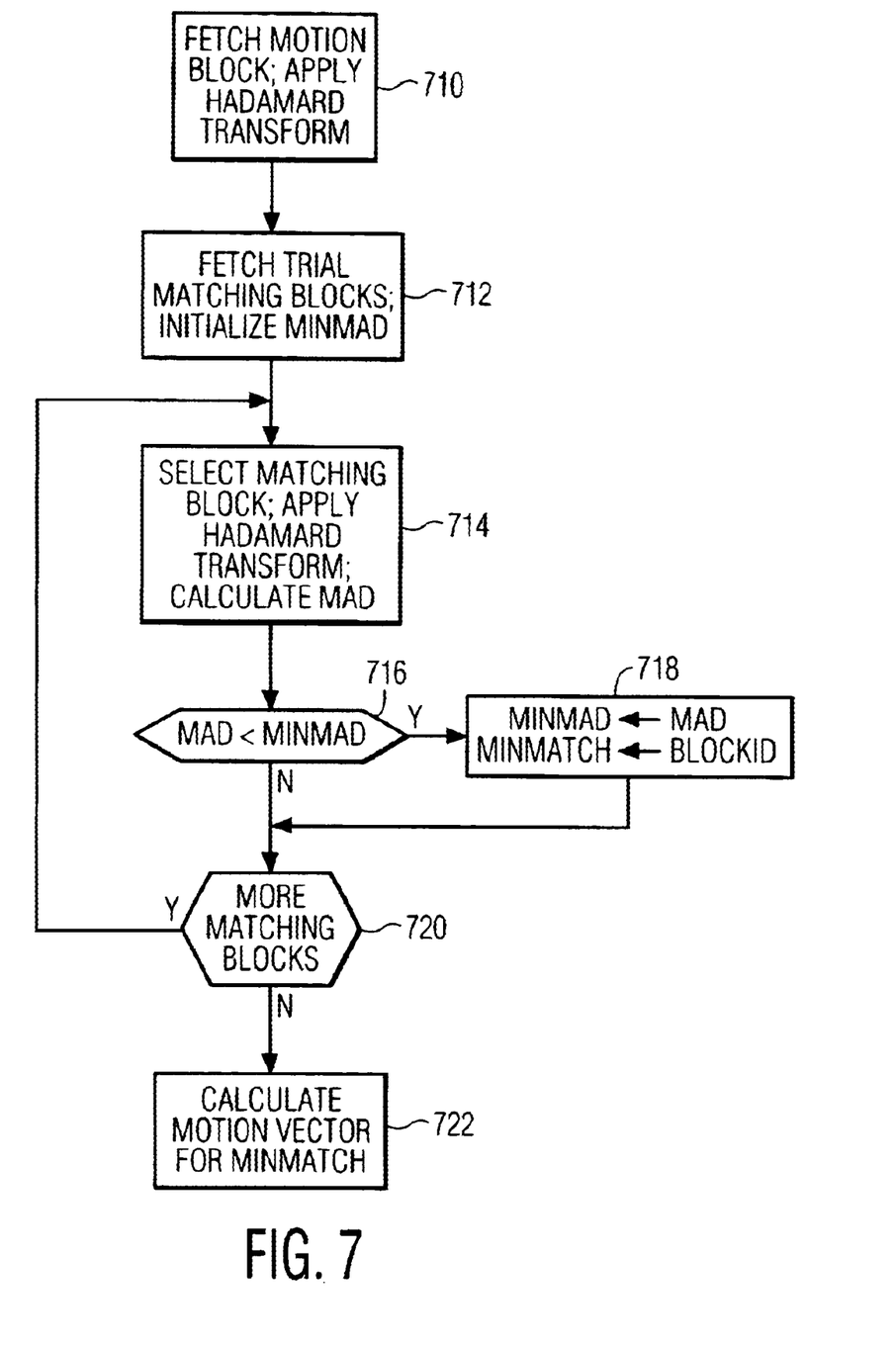
FIG. 7 is a flow-chart diagram which illustrates the operation of one of the processors shown in FIG. 6.

Each processor, $P_{0,0}$ through $P_{N_{v-1},N_{h-1}}$ operates according to the flowchart shown in FIG. 7. The first step in the flowchart, step 710, fetches the motion block from frame $F_k$ and applies the Hadamard transform. Step 712 fetches the trial matching blocks from frame $F_{k-1}$ and optionally from frame $F_{k+1}$. In addition, step 712 initializes a variable MINMAD to a large value. Next, step 714 selects one of the trial matching blocks and applies the Hadamard transform to the selected block. This operation is described above with reference to equation (8). Step 714 also calculates the mean absolute difference (MAD) between the selected transformed matching block and the transformed motion block. The calculation of the mean absolute difference is described above with reference to equation (9). At step 716, the value of MAD calculated in step 714 is compared to MINMAD. If MAD is less than MINMAD then step 718 is executed which assigns the value of MAD to the variable MINMAD and records the block identifier (BLOCK ID) of the block that was processed at step 714 into a variable MINMATCH. If MAD is not less than MINMAD at step 716 or after step 718, step 720 is executed. In step 720, the processor determines if any more matching blocks need to be processed. If so, control returns to step 714 to select the next matching block. If no other matching blocks are to be processed, step 722 is executed which calculates the motion vector for the block MINMATCH as described above with reference to equation (10).

The flowchart shown in FIG. 7 illustrates a software implementation of the invention. This software implementation may be in the form of a computer program which is conveyed via a carrier such as a diskette, CD-ROM or modulated carrier wave.

The result provided by the processor system shown in FIG. 6 is a motion vector field which includes a motion vector for each motion block the frame $F_k$. As set forth above with reference to equations (7) and (8), the Hadamard matrix and thus the reference block and the search blocks may include different numbers of pixels in each of the horizontal and vertical directions. Thus, the processor shown in FIG. 6 may operate on a 4×4 block as well as on a 16×16 block. Because the Hadamard transform operation, as defined by equation (6), uses two Hadamard matrixes of different order, the processor shown in FIG. 6 may also operate on a 16×4 block or on an 8×16 block.

Figure 8A:
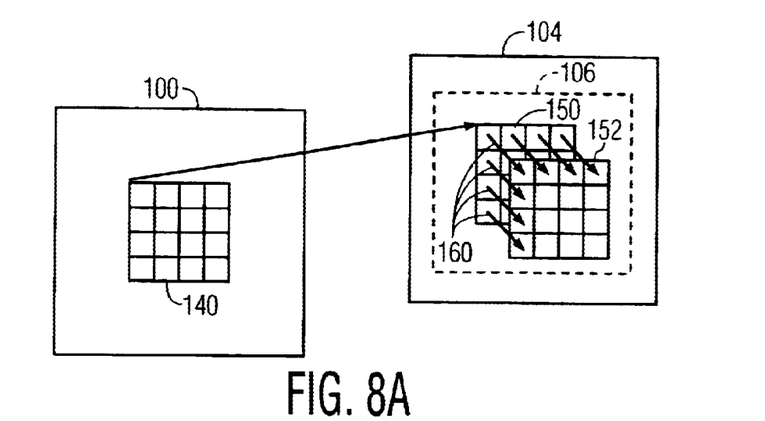
FIGS. 8A and 8B are multi-frame image diagrams which are useful for describing one block matching technique according to the present invention.
Figure 8B:
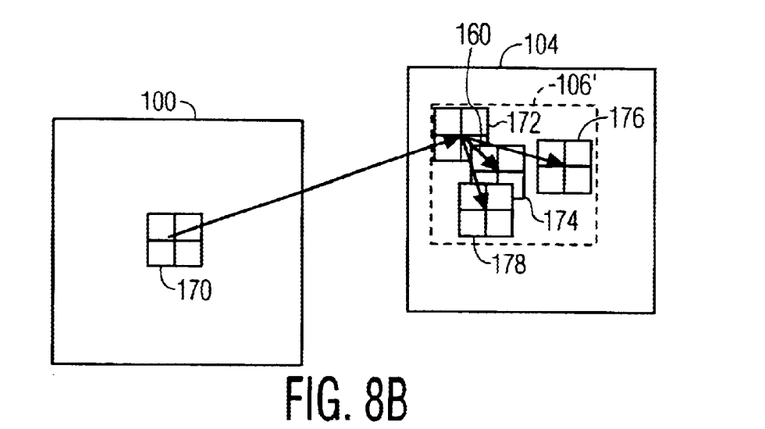

FIGS. 8A and 8B illustrate the application of the subject invention to a hierarchical motion block search algorithm. In FIG. 8A, a motion block 140 including sixteen 8×8 blocks of pixel values is transformed using a 32×32 Hadamard matrix and matching blocks 150 and 152 in the prior frame 104 are also subject to a 32×32 Hadamard transformation. A mean absolute difference is calculated for each of the transformed blocks 150 and 152. Because block 150 has the same location in the prior frame 104 as block 140 has in the current frame 100, the displacement between block 150 and block 152 defines the motion vector for block 140. Alternatively, a motion vector may be calculated for the 32×32 block of pixel values by low-pass filtering the 32×32 block of pixel values and decimating the filtered pixel values to produce, for example, an 8×8 block of pixel values. The low-pass filtering of the 32×32 block of pixel values acts to reduce aliasing distortion when the filtered block is subsampled to produce the 8×8 block of pixel values. The 8×8 block of pixel values may then be subject to a Hadamard transformation and compared to similar filtered, decimated and transformed trial matching blocks to find the best match. The low-pass filters and decimators are not shown in the drawing figures.

The motion vector calculated as shown in FIG. 8A covers 4 macroblocks under the MPEG-2 standard. Using the motion vector 160 identified by the method disclosed in FIG. 8A, a motion vector for a single macroblock may be generated as shown in FIG. 8B. In FIG. 8B, when a single macroblock 170 is used as the motion block, the motion vector 160 may be used to limit the search area 106' that is used to locate the matching block in the prior frame 104. As shown in FIG. 8B, the blocks 172, 174, 176 and 178 may be identified as trial matching blocks.

According to the algorithm, a 16×16 Hadamard transform is applied to the motion block 170 and to each of the trial matching blocks 172, 174, 176, and 178. The transformed blocks are then compared using the minimum mean absolute difference algorithm as described above with reference to equations (9) and (10) in order to select one block in the search region 106' as the matching block of the motion block 170. As set forth above, instead of using a 16×16 block of pixel values and a 16×16 Hadamard transform, the algorithm may filter and decimate the 16×16 block to produce an 8×8 block and apply an 8×8 Hadamard transform to the motion block and to each of a set of similar filtered and subsampled trial matching blocks.

The algorithm described with reference to FIGS. 8A and 8B employs Hadamard transforms of two different orders. In FIG. 8A, an order 32 Hadamard transform is performed. While in FIG. 8B an order 16 Hadamard transform is performed. As described above with reference to FIGS. 2 through 5, the processing circuitry used to perform the Hadamard transform may employ different orders of Hadamard transforms at different times in its processing. It is further contemplated that a single sequence of images may employ transforms of multiple orders. A high order transform may be used for large regions of the sequence of images which do not change significantly from image to image while a lower order Hadamard transform may be used in portions of the image which change more frequently. For example, in a news broadcast, the background may be encoded using relatively large order Hadamard transforms while the face of the newscaster is encoded using relatively low order Hadamard transforms.

Figure 9:
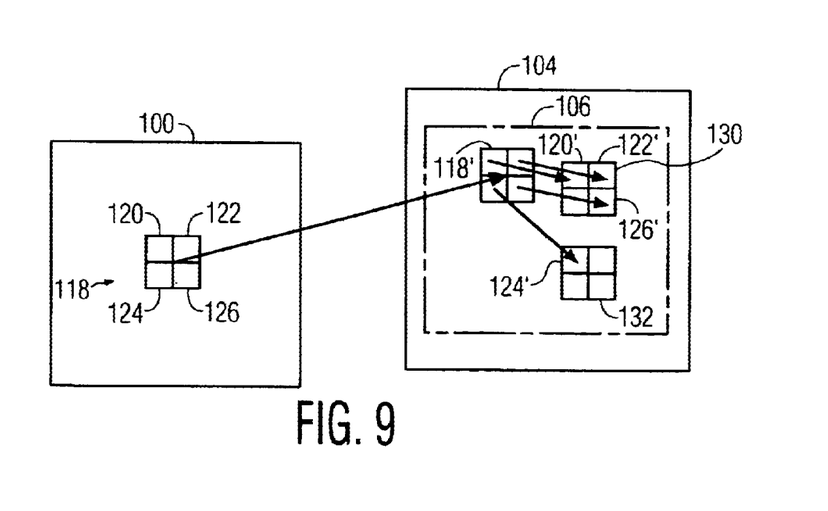
FIG. 9 is a multi-frame image diagram which is useful for describing another block matching technique according to the present invention.

In the motion estimation techniques described above with reference to FIGS. 8A and 8B, the hierarchical motion estimation is from large blocks to small blocks. It is contemplated, however, that a hierarchical technique may also proceed from small blocks to large blocks. FIG. 9 is an image diagram which illustrates an exemplary motion estimation method in which the motion of small blocks is used to infer a motion vector for a larger block. In FIG. 9, a motion block 118 of the current frame 100 includes 4 subblocks 120, 122, 124, and 126. In the exemplary embodiment of the invention, separate motion vectors are determined for each of the sub blocks. This is illustrated in FIG. 9 in the search frame 104, the block 118' represents a block in the same position and the search image as the motion block 118 is in the current image. Once the motion vectors have been determined, the sub blocks 120, 122 and 126 of the motion block are mapped into sub blocks 120', 122' and 123' of block 130 in the search image while the sub block 124 is mapped into sub block 124' of the search block 132. As with the conventional block motion algorithms described above with reference to FIG. 1, the search area is limited to a region 106 of the search image 104. Because three of the sub blocks of the motion block mapped into matching block 130 while only one of the sub blocks mapped into block 132, block 130 is selected as the matching block for the motion block 118.

In the block matching method shown in FIG. 9, each of the sub blocks 120, 122, 124, and 126 is first subject to a Hadamard transform as are all of the sub blocks in the search area 106 of the search frame 104. The block matching algorithm described above is then applied on a sub-block basis in the search area 106 of the search image 104.

While the subject invention has been described in terms of exemplary embodiments, it is contemplated that it may be practiced as outlined above within the scope of the appended claims.

What is claimed:

1. A method for processing pixel data representing first and second images to identify a matching block, including a plurality of pixel values, in a second image which corresponds to a motion block, including a respective plurality of pixel values, in a first image, the method comprising the steps of:

transforming the motion block of pixel values using a two-dimensional Hadamard transform operation to produce a transformed motion block, the transformed motion block including a plurality of coefficients corresponding to the plurality of pixel values in the motion block;

selecting a plurality of trial matching blocks from the second image, at least on trial matching block having pixel positions that partially overlap pixel positions of the motion block;

transforming each of the plurality of trial matching blocks using the two-dimensional Hadamard transform operation to produce a corresponding respective plurality of transformed matching blocks each of the transformed matching blocks including a plurality of coefficients corresponding to the plurality of pixel values in the respective matching blocks;

generating a plurality of measures of difference between the transformed motion block and each of the respective plurality of transformed matching blocks; and selecting, as the matching block, the trial matching block which corresponds to the transformed matching block having the measure of difference which is least among the plurality of measures of difference.

2. A method according to claim 1, wherein:

the step of generating a plurality of measures of difference between the transformed motion block and each of the respective plurality of transformed matching blocks includes the step of calculating a mean-squared error (MSE) between the coefficients of the transformed motion block and the respective coefficients of each of the transformed matching blocks; and the step of selecting the matching block selects the matching block corresponding to the transformed matching block having the MSE which is less than the MSE of any other transformed matching block.

3. A method according to claim 1, wherein:

the step of generating a plurality of measures of difference between the transformed motion block and each of the respective plurality of transformed matching blocks includes the step of calculating the mean absolute difference (MAD) between the coefficients of the transformed motion block and the respective coefficients of each of the transformed matching blocks; and the step of selecting the matching block selects the matching block corresponding to the transformed matching block having the MAD which is less than the MAD of any other transformed matching block.

4. A method according to claim 1, wherein the motion block includes a first number, M, of rows of pixel values and a second number, N, of columns of pixel values and the step of transforming the motion block includes the steps of:

multiplying an M by M Hadamard matrix by the motion block to produce an M by N matrix of values; and multiplying the M by N matrix of values by an N by N Hadamard matrix to produce an N by M block of transformed image values.

5. A method according to claim 1, where the first and second images are first and second successive frames of a video signal and differences between the first and second images correspond to inter-frame motion, the method further comprising the steps of:

identifying a reference block in the second frame which corresponds in position to the motion block;

determining a displacement between the reference block and the selected matching black in the second frame; and generating a motion vector from the displacement.

6. A method for processing pixel data representing first and second images to identify a matching block of pixel values in a second image which corresponds to a motion block of pixel values in a first image, the method comprising the steps of:

selecting an M by N block of pixel values in the first image, the M by N block of pixel values including the motion block of pixel values as a proper subset where M and N are integers greater than one;

transforming the M by N block of pixel values using a predetermined orthogonal transform operation to produce a transformed M by N block of pixel values;

selecting a plurality of trial M by N matching blocks from the second image;

transforming each of the plurality of trial M by N matching blocks using the predetermined transform operation to produce a corresponding plurality of transformed M by N matching blocks;

generating a plurality of measures of difference between the transformed M by N motion block and each of the respective plurality of transformed M by N matching blocks;

comparing the generated measures of difference to identify a minimum measure of difference and determining which transformed M by N matching block corresponds to the minimum measure of difference;

determining a displacement between the MA by N block and the selected M by N matching block;

transforming the motion block of pixel values using a predetermined orthogonal transform operation to produce a transformed motion block;

selecting a plurality of further trial matching blocks from the second image, the selected further trial matching blocks being clustered around the trial matching block which is displaced from the motion block by the determined displacement;

transforming each of the further trial matching blocks of pixel values using the predetermined orthogonal transform operation to produce a corresponding plurality of transformed further matching blocks;

generating a plurality of further measures of difference between the transformed motion block and each of the respective plurality of transformed further matching blocks; and selecting, as the matching block, the further trial matching block which corresponds to the transformed matching block having the measure of difference which is less than any of the other measures of difference of the plurality of further measures of difference.

7. Apparatus for processing pixel data representing first and second images to identify a matching block of pixel values in a second image which corresponds to a motion block of pixel values in a first image, the apparatus comprising:

a transform processor which transforms the motion block of pixel values using a two-dimensional Hadamard transform operation to produce a transformed motion block;

a plurality of further transform processors which select a respective plurality of trial matching blocks from the second image, at least one trial matching bock having pixel positions that partially overlap pixel positions of the motion block, and transform the respective trial matching blocks of pixel values using the two-dimensional Hadamard transform operation to produce a corresponding plurality of transformed matching blocks;

a comparator which generates a plurality of measures of difference between the transformed motion block and each of the respective plurality of transformed matching blocks and identifies one of the measures of difference as a minimum measure of difference, wherein the trial matching block which corresponds to the transformed matching block having the minimum measure of difference is identified as the matching block of pixel values which corresponds to the motion block of pixel values.

8. Apparatus according to claim 7, wherein the comparator comprises:

means for calculating the mean-squared error (MSE) between the transformed motion block and each of the transformed matching blocks; and means for selecting the trial matching block corresponding to the transformed matching block having the MSE which is less than the MSE of any other transformed block as the matching block of pixel values.

9. Apparatus according to claim 7, wherein the comparator comprises:

means for calculating the mean absolute difference (MAD) between the transformed motion block and each of the transformed matching blocks; and means for selecting the trial matching block corresponding to the transformed matching block having the MAD which is less than the MAD of any other transformed block as the matching block of pixel values.

10. Apparatus according to claim 9, where the first and second images are first and second successive frames of a video signal and differences between the first and second images correspond to inter-frame motion, the apparatus further comprising:

means for identifying a reference block in the second frame which corresponds in position to the motion block;

means for determining a displacement between the reference block and the selected matching block in the second frame; and means for generating a motion vector from the displacement.

11. A carrier including a computer program, the computer program including a plurality of instructions which cause a computer to perform the steps of:

identifying a motion block including a plurality of pixel values from a first image;

transforming the motion block of pixel values using a two-dimensional Hadamard transform operation to produce a transformed motion block, the transformed motion block including a plurality of coefficients corresponding to the plurality of pixel values in the motion block;

selecting a plurality of trial matching blocks from the second image, at least one trial matching block having pixel positions that partially overlap pixel positions of the motion block;

transforming each of the plurality of trial matching blocks of pixel values using the two-dimensional Hadamard transform operation to produce a corresponding plurality of transformed matching blocks each of the transformed matching blocks including a plurality of coefficients corresponding to the plurality of pixel values in the respective matching blocks;

generating a plurality of measures of difference between the transformed motion block and each of the respective plurality of transformed matching blocks; and selecting, as a matching block, the trial matching block which corresponds to the transformed matching block having the measure of difference which is less than any of the other measures of difference of the plurality of measures of difference.

* * * * *